US012665970B2

(12) United States Patent
Sheikh

(10) Patent No.: US 12,665,970 B2
(45) Date of Patent: Jun. 23, 2026

(54) METHOD, SYSTEM AND ARTICLE OF MANUFACTURE FOR PAIRING CONTACTS WITH AGENTS IN CONTACT CENTER SYSTEM

(71) Applicant: Isbei Ltd., Grand Cayman (KY)

(72) Inventor: Abdullah Asghar Sheikh, Lahore (PK)

(73) Assignee: ISBEI LTD., Grand Cayman (KY)

( * ) Notice: Subject to any disclaimer, the term of this patent is extended or adjusted under 35 U.S.C. 154(b) by 271 days.

(21) Appl. No.: 18/542,204

(22) Filed: Dec. 15, 2023

(65) Prior Publication Data

US 2025/0184430 A1 Jun. 5, 2025

(30) Foreign Application Priority Data

Nov. 30, 2023 (CN) .......................... 202311628235.0

(51) Int. Cl.
*H04M 3/523* (2006.01)
(52) U.S. Cl.
CPC ................................. *H04M 3/5232* (2013.01)
(58) Field of Classification Search
None
See application file for complete search history.

(56) References Cited

U.S. PATENT DOCUMENTS

| | | | | |
|---|---|---|---|---|
| 9,942,405 | B1 * | 4/2018 | Kan | ................... H04M 3/5235 |
| 10,110,746 | B1 | 10/2018 | Chishti | |
| 10,122,860 | B1 | 11/2018 | Chishti | |

| | | | |
|---|---|---|---|
| 10,298,763 | B2 | 5/2019 | Chishti |
| 10,509,671 | B2 | 12/2019 | Ittai |
| 11,070,674 | B2 | 7/2021 | Chishti |
| 11,399,096 | B2 | 7/2022 | Chishti |
| 2014/0280426 | A1 | 9/2014 | Clarkson et al. |
| 2015/0332414 | A1 | 11/2015 | Unser et al. |
| 2016/0247163 | A1 | 8/2016 | Donsky |

(Continued)

FOREIGN PATENT DOCUMENTS

| | | |
|---|---|---|
| CN | 108629481 A | 10/2018 |
| CN | 108780533 A | 11/2018 |

(Continued)

OTHER PUBLICATIONS

CN2023107710496—The First Office Action and Translation dated Jul. 1, 2025.

(Continued)

*Primary Examiner* — Quynh H Nguyen
(74) *Attorney, Agent, or Firm* — LOZA & LOZA, LLP; Michael Fedrick

(57) ABSTRACT

Provided is a method for pairing contacts with agents in a contact center system, including: determining a threshold statistic; determining an ordered set of contacts; determining a set of first statistics that correspond to the ordered set of contacts; determining a set of second statistics that correspond to the ordered set of contacts and is based on the set of first statistic, in which the set of second statistics is based on a cumulative summation of the set of first statistics; determining a subset of the set of contacts based on the ordered set of second statistics and the threshold statistic; and pairing a selected contact from the subset of the ordered set of contacts with an available agent based on a pairing strategy.

15 Claims, 3 Drawing Sheets

Contact Center System
100

(56)            References Cited

U.S. PATENT DOCUMENTS

| | | | |
|---|---|---|---|
| 2022/0321702 A1* | 10/2022 | Chishti | ................. G06Q 30/01 |
| 2025/0005024 A1 | 1/2025 | Sheikh | |
| 2025/0008022 A1 | 1/2025 | Sheikh | |
| 2025/0184430 A1 | 6/2025 | Sheikh | |

FOREIGN PATENT DOCUMENTS

| | | |
|---|---|---|
| CN | 110709826 A | 1/2020 |
| CN | 113095658 A | 7/2021 |
| CN | 113163062 A | 7/2021 |

OTHER PUBLICATIONS

CN2023107710689—The First Office Action and Translation dated Jul. 23, 2025.

* cited by examiner

Contact Center System
100

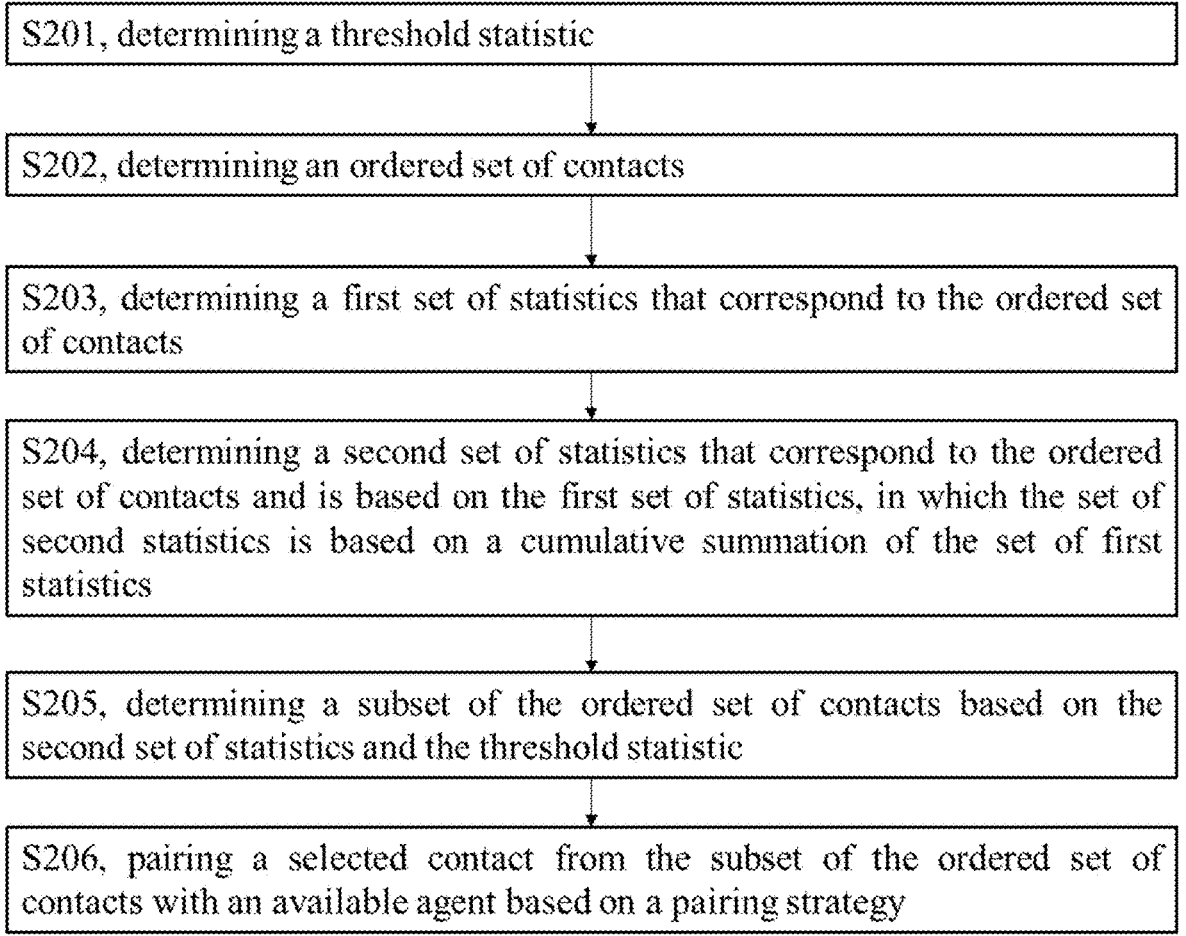

S201, determining a threshold statistic

S202, determining an ordered set of contacts

S203, determining a first set of statistics that correspond to the ordered set of contacts S204, determining a second set of statistics that correspond to the ordered set of contacts and is based on the first set of statistics, in which the set of second statistics is based on a cumulative summation of the set of first statistics S205, determining a subset of the ordered set of contacts based on the second set of statistics and the threshold statistic S206, pairing a selected contact from the subset of the ordered set of contacts with an available agent based on a pairing strategy

Fig. 2

| Contact | First Statistic (wait time) | Second Statistic (cumulative wait time) | | In subset? |
|---------|------------------------------|------------------------------------------|--|------------|
| 1 | 100s | 100s | | YES |
| 2 | 40s | 140s | Threshold statistic: 150s (1.5x longest wait time) | YES |
| 3 | 20s | 160s | | NO |
| 4 | 10s | 170s | | NO |
| 5 | 1s | 171s | | NO |

Fig. 3

METHOD, SYSTEM AND ARTICLE OF MANUFACTURE FOR PAIRING CONTACTS WITH AGENTS IN CONTACT CENTER SYSTEM

CROSS-REFERENCE TO RELATED APPLICATIONS

The present application claims priority to Chinese Patent Application No. CN202311628235.0, filed with the China National Intellectual Property Administration on Nov. 30, 2023, the disclosure of which is hereby incorporated herein by reference in its entirety.

TECHNICAL FIELD

This disclosure generally relates to assignment strategies, and more particularly, to techniques for pairing contacts with agents in a contact center system.

BACKGROUND

A contact center is a system for receiving or transmitting a large number of contacts such as voice telephone calls, Internet text chats, e-mails, and video calls, etc. Contact centers may include an outbound contact center that transmits outgoing contacts and/or an inbound contact center that receives incoming contacts. Outbound contact centers are often used to sell products, collect outstanding credit balances, or to survey consumer sentiment, among other applications. Inbound contact centers are also used to sell or cross-sell products, to service customer support or technical support enquiries, to retain customers, upgrade and downgrade services, or in other applications.

A number of assignment strategies may be used to pair agents with contacts. In some traditional contact centers, contacts are assigned to agents sequentially, either according to a contact's arrival time, or the time at which an agent becomes available. Such strategy may be referred to as first-in-first-out ("FIFO") strategy. For example, if multiple agents are available to receive a contact in a contact center ("agent surplus"), a FIFO strategy will assign an incoming contact to the longest waiting agent. Similarly, if multiple contacts are waiting for assignment ("contact surplus"), a FIFO strategy will assign the longest waiting contact to the first available agent. However, FIFO only seeks to balance the waiting time of agents or contacts, and may not be aligned with other contact center metrics such as revenue generation, customer satisfaction improvement, or cost reduction.

To better optimize such other contact center metrics, some contact centers adopt alternative agent-customer assignment strategies. One example of such an assignment strategy is performance-based-routing ("PBR") strategy. In a PBR strategy, if there are multiple agents available to receive a contact in a contact center, an incoming contact will be assigned to the agent that has a history of better performance compared to other available agents. Similarly, if all agents are occupied and many contacts have been waiting for assignment, a PBR strategy assigns the contact it determines to be of the highest expected value (highest potential to make a successful interaction) to whichever agent first becomes available. However, PBR strategies may skew the utilization of agents, assigning substantially more contacts to certain agents than other agents. Similarly, PBR strategies may have adverse effects on contacts, i.e., some contacts may never get assigned to an agent or some agents are highly over utilized.

Another example of an assignment strategy is behavioral pairing ("BP") strategy. BP strategies seek to balance utilization of agents and waiting time of customers while still delivering improvement in contact center metrics relative to FIFO. In a BP strategy, contacts and agents are paired so that the total overall expected value of all agents and contacts in both queues may be optimized.

However, in a contact surplus environment, a contact may take a longer time to get paired with an available agent with a BP strategy, relative to the time it would take to get paired in a FIFO strategy. As a result, in a BP strategy there may be a higher probability that some contacts might abandon their interactions before being connected to an agent. As a result, the proportion of contacts that result in a contact abandon ("abandon rate") in a BP strategy may by higher than in a FIFO strategy.

In order to reduce the abandon rate of BP strategy in a contact surplus environment, U.S. Pat. No. 10,509,671 discloses a method for behavioral pairing in a task assignment system, in which the queue of waiting contacts is filtered before applying a pairing strategy. This filtration selects a predetermined number ("N") of longest-waiting contacts from the queue of waiting contacts. This filtered set of contacts is referred to as a "Front-N" subset of contacts. After establishing a Front-N subset, a contact center may apply a BP strategy only to the subset, excluding the balance of longer-waiting contacts in the queue. The above method is also known as Front-N strategy.

However, such a strategy ignores the actual time each contact has been waiting in queue. As a result, a Front-N subset may contain contacts with substantially different waiting times. For example, in a Front-N subset with three contacts, the first contact may have been waiting for 100 seconds, the second contact may have been waiting for 2 seconds, and the third contact may have been waiting for 1 second. In such a case all three of the contacts in the Front-N subset would have an equal probability of being assigned in a BP strategy, even though the first contact may be more likely to abandon than the second and third contacts. As a result, a Front-N strategy, while improving on a pure BP strategy, may still have a substantially elevated abandon rate.

Accordingly, there is a need for an improved strategy for pairing contacts with agents in a contact center system that further reduces abandon rates.

SUMMARY

An embodiment of the present disclosure provides a method for pairing contacts with agents in a contact center system, including: determining a threshold statistic; determining an ordered set of contacts; determining a set of first statistics that correspond to the ordered set of contacts; determining a set of second statistics that correspond to the ordered set of contacts and is based on the set of first statistics, in which the set of second statistics is based on a cumulative summation of the set of first statistics; determining a subset of the ordered set of contacts based on the set of second statistics and the threshold statistic; and pairing a selected contact from the subset of the ordered set of contacts with an available agent based on a pairing strategy.

Optionally, in the above method, the set of first statistics and the set of second statistics are based on waiting time.

Optionally, in the above method, the threshold statistic is based on an average value, maximum value, or minimum value of the set of first statistics.

Optionally, in the above method, the pairing strategy is BP strategy.

Optionally, in the above method, the pairing strategy is based on contact priority.

An embodiment of the present disclosure also provides a system for pairing contacts with agents in a contact center system, including: at least one computer processor connected to an intelligent pairing module configured to paring contacts with agents in the contact center system, in which the at least one computer processor is further configured to: determine a threshold statistic; determine an ordered set of contacts; determine a set of first statistics that correspond to the ordered set of contacts; determine a set of second statistics that correspond to the ordered set of contacts and is based on the set of first statistics, in which the set of second statistics is based on a cumulative summation of the set of first statistics; determine a subset of the ordered set of contacts based on the set of second statistics and the threshold statistic; and pair a selected contact from the subset of the ordered set of contacts with an available agent based on a pairing strategy.

Optionally, in the above system, the set of first statistics and the set of second statistics are based on waiting time.

Optionally, in the above system, the threshold statistic is based on an average value, maximum value, or minimum value of the set of first statistics.

Optionally, in the above system, the pairing strategy is BP strategy.

Optionally, in the above system, the pairing strategy is based on contact priority.

An embodiment of the present disclosure further provides an article of manufacture for pairing contacts with agents in a contact center system, including: a non-transitory processor readable medium, and instructions stored on the medium, in which the instructions are configured to be readable from the medium by at least one computer processor connected to an intelligent pairing module configured to paring contacts with agents in the contact center system, and thereby cause the at least one computer processor to operate so as to: determine a threshold statistic; determine an ordered set of contacts; determine a set of first statistics that correspond to the ordered set of contacts; determine a set of second statistics that correspond to the ordered set of contacts and is based on the set of first statistics, in which the set of second statistics is based on a cumulative summation of the set of first statistics; determine a subset of the ordered set of contacts based on the set of second statistics and the threshold statistic; and pair a selected contact from the subset of the ordered set of contacts with an available agent based on a pairing strategy.

Optionally, in the above article of manufacture, the set of first statistics and the set of second statistics are based on waiting time.

Optionally, in the above article of manufacture, the threshold statistic is based on an average value, maximum value, or minimum value of the set of first statistics.

Optionally, in the above article of manufacture, the pairing strategy is BP strategy.

Optionally, in the above article of manufacture, the pairing strategy is based on contact priority.

BRIEF DESCRIPTION OF THE DRAWINGS

FIG. 2 is a flow diagram showing a method for pairing contacts with agents in a contact center system according to an embodiment of the present disclosure.

FIG. 3 is a schematic view showing a method for pairing contacts with agents in a contact center system according to an embodiment of the present disclosure.

DETAILED DESCRIPTION

Figure 1:
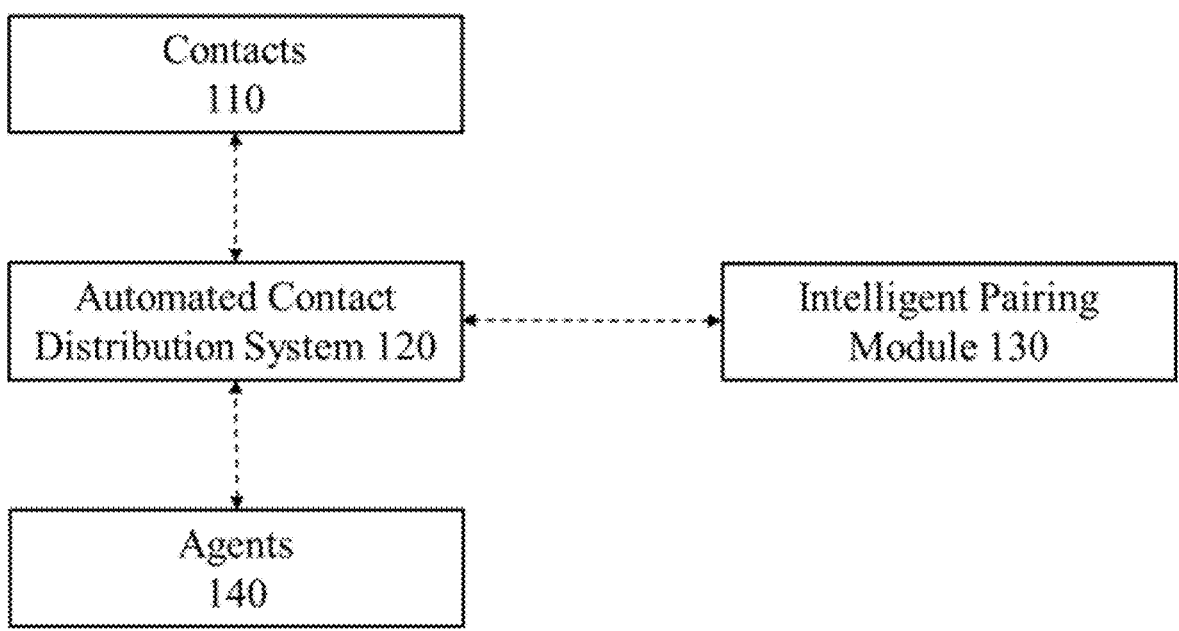
FIG. 1 is a schematic view showing a contact center system according to an embodiment of the present disclosure.

In order to illustrate the technical solutions of the present disclosure in a clearer manner, the drawings desired for the embodiments of the present disclosure will be described briefly hereinafter. Obviously, the following drawings merely relate to some embodiments of the present disclosure. Based on these drawings, a person skilled in the art may obtain the other embodiments without any creative effort.

As used herein, the term "module" can be understood as referring to computing software, firmware, hardware and/or various combinations thereof, which can be configured as network elements, computers and/or components of systems. Modules should not be interpreted as software not implemented on hardware or firmware, or recorded on processor-readable storage media. These modules can be combined, integrated, separated and/or replicated to support various applications. The modules can be implemented on multiple devices and/or other components, which can be local or remote. In addition, these modules can be removed from one device and added to another device, and/or can be included in two devices.

FIG. 1 is a schematic view showing a contact center system according to embodiments of the present disclosure, and shows an example of a contact center system 100, which may include: an automated contact distribution ("ACD") system 120, an intelligent pairing module 130; and agents 140.

The ACD system 120 may be configured to receive incoming contacts (e.g., callers) 110, or support outbound connections to contacts via a telecommunication network. The ACD system may include contact routing hardware and software for helping to route contacts in one or more contact centers. The ACD system may also include queuing or switching components within the contact center system 100.

The intelligent pairing module 130 is connected to the ACD system 120, and is configured to pair contacts with agents based on pairing strategies.

FIG. 2 is a flow diagram showing a method for pairing contacts and agents in a contact center system, including: S201, determining a threshold statistic; S202, determining an ordered set of contacts; S203, determining a set of first statistics that correspond to the ordered set of contacts; S204, determining a set of second statistics that correspond to the ordered set of contacts and is based on the set of first statistics, in which the set of second statistics is based on a cumulative summation of the set of first statistics; S205, determining a subset of the ordered set of contacts based on the set of second statistics and the threshold statistic; and S206, pairing a selected contact from the subset of the ordered set of contacts with an available agent based on a pairing strategy.

FIG. 3 is a schematic view showing a method for pairing contacts with agents in a contact center system according to an embodiment of the present disclosure.

In this embodiment, there are five contacts in a queue ordered based on the duration they have been waiting to be paired with agents. The first statistics associated with these contacts is their waiting time. The longest waiting Contact 1 has been waiting 100 seconds, while the shortest waiting Contact 5 has been waiting 1 second. The second statistic associated with these contacts is the sum of waiting time for each contact together with the waiting times of all contacts that have been waiting longer. For example, Contact 2's second statistic is 140 seconds, which is the sum of Contact 2's waiting time and Contact 1's waiting time. The threshold statistic has been set to 150 seconds, which is 1.5 times the waiting time of the longest-waiting contact, Contact 1. Accordingly, Contact 1 and Contact 2 are in the subset because their second statistic is less than the threshold statistic. Contact 3, Contact 4, and Contact 5 are not in the subset because their second statistic is greater than the threshold statistic.

Unlike a subset created by a Front-N filtering strategy, there is no pre-set number of contacts assigned to a subset in a Cumulative Statistic strategy. The number of contacts assigned to a subset in a Cumulative Statistic strategy will dynamically vary based on the conditions of the contact center. This variance may take into consideration the actual waiting time of the contacts in queue and, as a result, reduce the abandon rate relative to a Front-N strategy.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for pairing contacts with agents, which is applied in a contact center system, wherein the contact center system comprises: an automated contact distribution system, an intelligent pairing module, and agents, and the method comprises:

receiving, by the automated contact distribution system, incoming contacts; or supporting, by the automated contact distribution system, outbound connections to contacts via a telecommunication network;

determining, by a computer processor, a threshold statistic;

determining, by the computer processor, an ordered set of contacts;

determining, by the computer processor, a set of first statistics that correspond to the ordered set of contacts;

determining, by the computer processor, a set of second statistics that correspond to the ordered set of contacts and is based on the set of first statistics, wherein the set of second statistics is based on a cumulative summation of the set of first statistics;

determining, by the computer processor, a subset of the ordered set of contacts based on the set of second statistics and the threshold statistic;

pairing, by the computer processor, a selected contact from the subset of the ordered set of contacts with an available agent based on a pairing strategy; and routing, by the automated contact distribution system, the selected contact to the available agent, so as to achieve the connection of the selected contact.

2. The method of claim 1, wherein the set of first statistics and the set of second statistics are based on waiting time.

3. The method of claim 1, wherein the threshold statistic is based on an average value, maximum value, or minimum value of the set of first statistics.

4. The method of claim 1, wherein the pairing strategy is behavioral pairing (BP) strategy.

5. The method of claim 1, wherein the pairing strategy is based on contact priority.

6. A system for pairing contacts with agents, which is applied in a contact center system, wherein the contact center system comprises: an automated contact distribution system, an intelligent pairing module, and agents, and the automated contact distribution system is configured to receive incoming contacts; or support outbound connections to contacts via a telecommunication network, the system for pairing contacts with agents comprises:

at least one computer processor connected to the intelligent pairing module configured to paring contacts with agents in the contact center system, wherein the at least one computer processor is further configured to:

determine a threshold statistic;

determine an ordered set of contacts;

determine a set of first statistics that correspond to the ordered set of contacts;

determine a set of second statistics that correspond to the ordered set of contacts and is based on the set of first statistics, wherein the set of second statistics is based on a cumulative summation of the set of first statistics;

determine a subset of the ordered set of contacts based on the set of second statistics and the threshold statistic;

pair a selected contact from the subset of the ordered set of contacts with an available agent based on a pairing strategy; and the automated contact distribution system is further configured to route the selected contact to the available agent, so as to achieve the connection of the selected contact.

7. The system of claim 6, wherein the set of first statistics and the set of second statistics are based on waiting time.

8. The system of claim 6, wherein the threshold statistic is based on an average value, maximum value, or minimum value of the set of first statistics.

9. The system of claim 6, wherein the pairing strategy is behavioral pairing (BP) strategy.

10. The system of claim 6, wherein the pairing strategy is based on contact priority.

11. An article of manufacture for pairing contacts with agents, which is applied in a contact center system, wherein the contact center system comprises: an automated contact distribution system, an intelligent pairing module, and agents, and the automated contact distribution system is configured to receive incoming contacts; or support outbound connections to contacts via a telecommunication network, the article of manufacture comprises:

a non-transitory processor readable medium, and instructions stored on the medium, wherein the instructions are configured to be readable from the medium by at least one computer processor connected to the intelligent pairing module configured to paring contacts with agents in the contact center system, and thereby cause the at least one computer processor to operate so as to:

determine a threshold statistic;

determine an ordered set of contacts;

determine a set of first statistics that correspond to the ordered set of contacts;

determine a set of second statistics that correspond to the ordered set of contacts and is based on the set of first statistics, wherein the set of second statistics is based on a cumulative summation of the set of first statistics;

determine a subset of the ordered set of contacts based on the set of second statistics and the threshold statistic;

pair a selected contact from the subset of the ordered set of contacts with an available agent based on a pairing strategy; and the automated contact distribution system is further configured to route the selected contact to the available agent, so as to achieve the connection of the selected contact.

12. The article of manufacture of claim 11, wherein the set of first statistics and the set of second statistics are based on waiting time.

13. The article of manufacture of claim 11, wherein the threshold statistic is based on an average value, maximum value, or minimum value of the set of first statistics.

14. The article of manufacture of claim 11, wherein the pairing strategy is behavioral pairing (BP) strategy.

15. The article of manufacture of claim 11, wherein the pairing strategy is based on contact priority.

* * * * *